United States Patent [19]

Kowalski

[11] 4,044,428

[45] Aug. 30, 1977

[54] CONDUIT CLAMP

[75] Inventor: Joseph W. Kowalski, Florissant, Mo.

[73] Assignee: B-Line Systems, Inc., Highland, Ill.

[21] Appl. No.: 611,529

[22] Filed: Sept. 8, 1975

[51] Int. Cl.² .......................... F16L 3/08; B65D 67/02
[52] U.S. Cl. ............................. 24/16 R; 248/74 R; 52/98
[58] Field of Search .......... 248/74 R; 24/263, 16 PB, 24/73 SA; 52/98

[56] References Cited

U.S. PATENT DOCUMENTS

| 3,258,887 | 7/1966 | Mostoller | 52/98 |
| 3,370,815 | 2/1968 | Opperthauser | 248/74 R |
| 3,463,428 | 8/1969 | Kendorf et al. | 248/74 R |
| 3,504,460 | 4/1970 | Solberg | 52/98 |
| 3,564,676 | 2/1971 | Oeser | 248/74 R |
| 3,650,499 | 3/1972 | Biggane | 248/74 R |
| 3,875,620 | 4/1975 | Wells et al. | 24/16 PB |

Primary Examiner—Paul R. Gilliam
Assistant Examiner—Victor N. Sakran
Attorney, Agent, or Firm—Koenig, Senninger, Powers and Leavitt

[57] ABSTRACT

A clamp for clamping a conduit to a support, the clamp accommodating any conduit having an outer diameter within a specified range of diameters. The clamp includes a pair of clamping straps, one for each side of the conduit and each strap has a stem portion having ears engageable with the channel, an intermediate portion having a window or cutout therein with bridge portions on opposite sides of the window, and an outer end portion. The outer ends of the straps are bolted together so that upon the ends of the straps being drawn together, the bridge portions of the straps conform to and grip portions of the outer surface of the conduit. The window, the bridge portions and the ears of the straps are so structured that the tensile strength of the bridge portion only slightly exceeds the strength of the ears.

2 Claims, 3 Drawing Figures

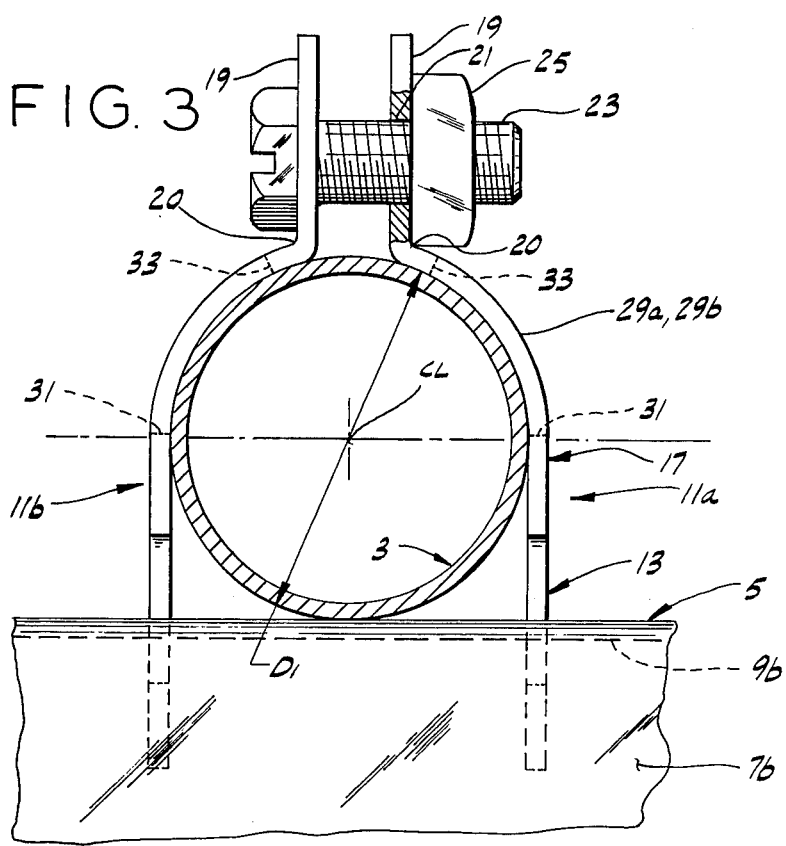
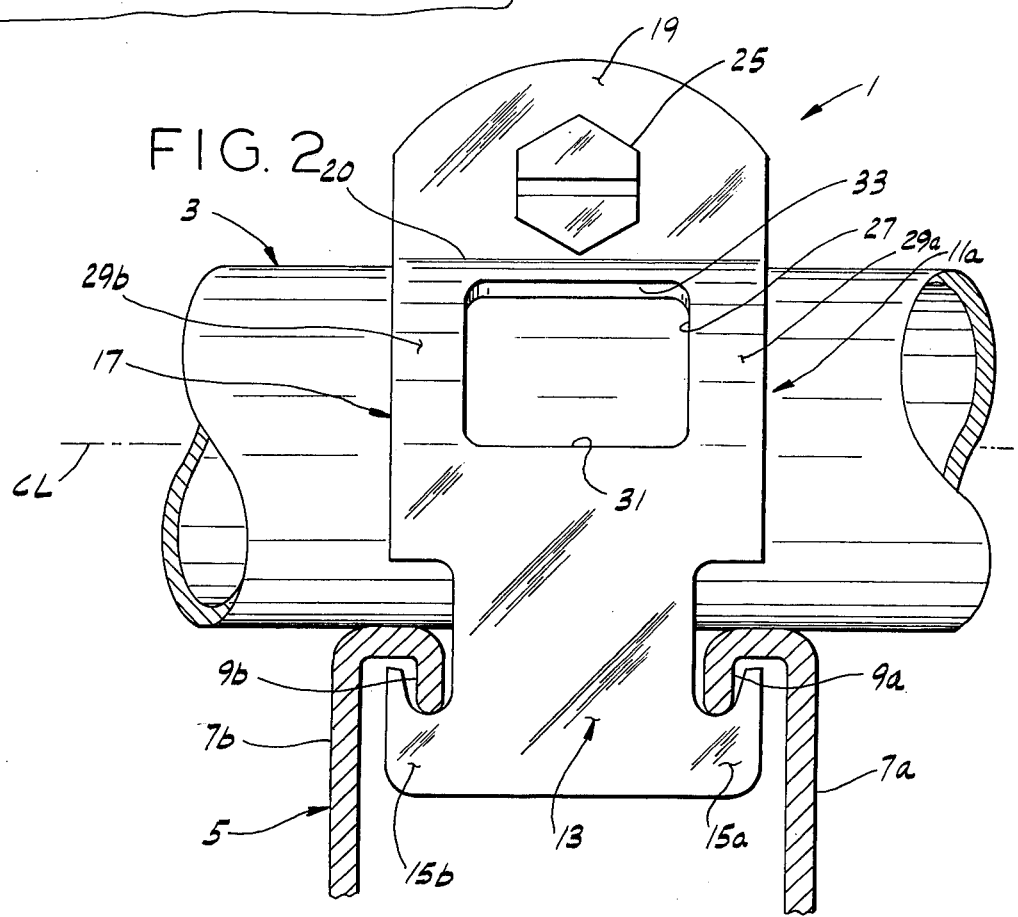

CONDUIT CLAMP

BACKGROUND OF THE INVENTION

This invention relates to a clamp for clamping a conduit, a pipe or the like to a support, and more particularly to such a clamp which can accommodate any conduit having an outer diameter which ranges between a specified minimum diameter and a specified maximum diameter.

Generally, electrical conduits, pipes, etc., routed overhead in buildings or through pipe tunnels are supported at spaced intervals by channel-shaped supports. These channel supports conventionally have spaced side flanges with inwardly turned, hook-shaped outer lips forming a slot therebetween. The conduits are supported on the outer edges of these flanges and extend generally perpendicularly to the channel. Often, multiple runs of conduit or pipe are supported by the channel supports with the conduits spaced closely to one another, but not touching one another.

Conventional clamps used to secure the conduits in place on the support channels utilize a pair of clamping straps of solid sheet metal or the like, one for each side of the conduit. Each of these straps is insertable into the slot in the channel for engagement with the above-mentioned lips of the channel. Generally, known prior art clamping straps are accurately preformed so that they conform to the outer surface of a conduit having a specified outer diameter. The outer ends of these prior art clamping straps are typically bolted together so as to hold the conduit on the support channel.

Because these prior art conduit clamps are accurately preformed to match the curvature of a particular size conduit, they are not suited for clamping different sizes of conduit. Generally, conduit and tubing come in a variety of nominal sizes and are available with wall thicknesses of thin or intermediate construction or as standard tubing having a somewhat greater wall thickness. With known prior art clamps, a different clamp must be used for clamping thin wall conduit, intermediate wall conduit, or standard tubing, even if the nominal size of these conduits or tubing is the same. This necessitates stocking a large number of clamps. Because a different size clamp must be used for each size and type of conduit or pipe to be clamped, a workman on the job may not have the proper size clamp readily available. Thus, either the workman must stop his work to obtain the proper clamp which wastes considerable time or he may attempt to use another size clamp which results in improper clamping of the conduit.

It is conventional that conduit clamps be required to withstand a specified load applied to the conduit which tends to pull it away from its support channel.

SUMMARY OF THE INVENTION

Among the many objects of this invention may be noted the provision of a conduit clamp which can accommodate any conduit or other circular cross-section member having an outer diameter within a specified range of diameters; the provision of such a clamp which will greatly lessen the number of sizes of clamps which must be stocked to clamp thin wall conduit, intermediate wall conduit and standard piping in a range of specified nominal sizes; the provision of such a clamp which securely locks any conduit within a specified range of outer diameters to a support channel; the provision of such a clamp which will withstand a maximum specified load and hold the conduit on its support channel; the provision of such a clamp which substantially lessens the chances of a workman clamping a conduit with the wrong size clamp; and the provision of such a clamp which is economical to manufacture and easy to install. Other objects and features of this invention will be in part apparent and in part pointed out hereinafter.

Briefly, a clamp of this invention is provided for clamping a member of generally circular cross-section, such as a conduit or the like, to a channel having side flanges each having an inwardly directed, hook-shaped lip defining a slot therebetween with the member extending generally perpendicular to the channel and engaging the outer edges of the lips. The clamp of this invention is adapted to clamp any of a plurality of the above-mentioned members having outer diameters ranging from a specified minimum diameter to a specified maximum diameter. The clamp comprises a pair of clamp straps, one for each side of the member, each of which comprises a generally flat stem portion of a width less than the width of the slot, and an ear at each lateral side of the stem extending out beyond a respective side of the stem for engagement with one of the lips. An intermediate portion is bent out of the plane of the stem to extend around and grip a portion of the surface of the member to be clamped, and an outer end portion extends from the intermediate portion. Means is provided engageable with the outer end portions of the head portion for drawing together the straps on opposite sides of the member. The intermediate portion of each strap has a cutout therein and bridge portions on opposite sides of the cutout, these bridge portions being adapted to conform to the outer surface of the member upon the straps being drawn together. The cutout, the bridge portion and the ears are so structured that the tensile strength of the bridge portion only slightly exceeds the strength of the ears so that upon application of a force which tends to pull the member away from the channel, the ears will fail prior to failure of the bridge portions.

BRIEF DESCRIPTION OF THE DRAWINGS

FIG. 2 is an enlarged side elevational view of a clamping strap of the clamp of the present invention; and FIG. 3 is an edge view of the clamp of this invention with portions of the clamping strap broken away.

Corresponding reference characters indicate corresponding parts throughout the several views of the drawings.

BRIEF DESCRIPTION OF A PREFERRED EMBODIMENT

Figure 1:
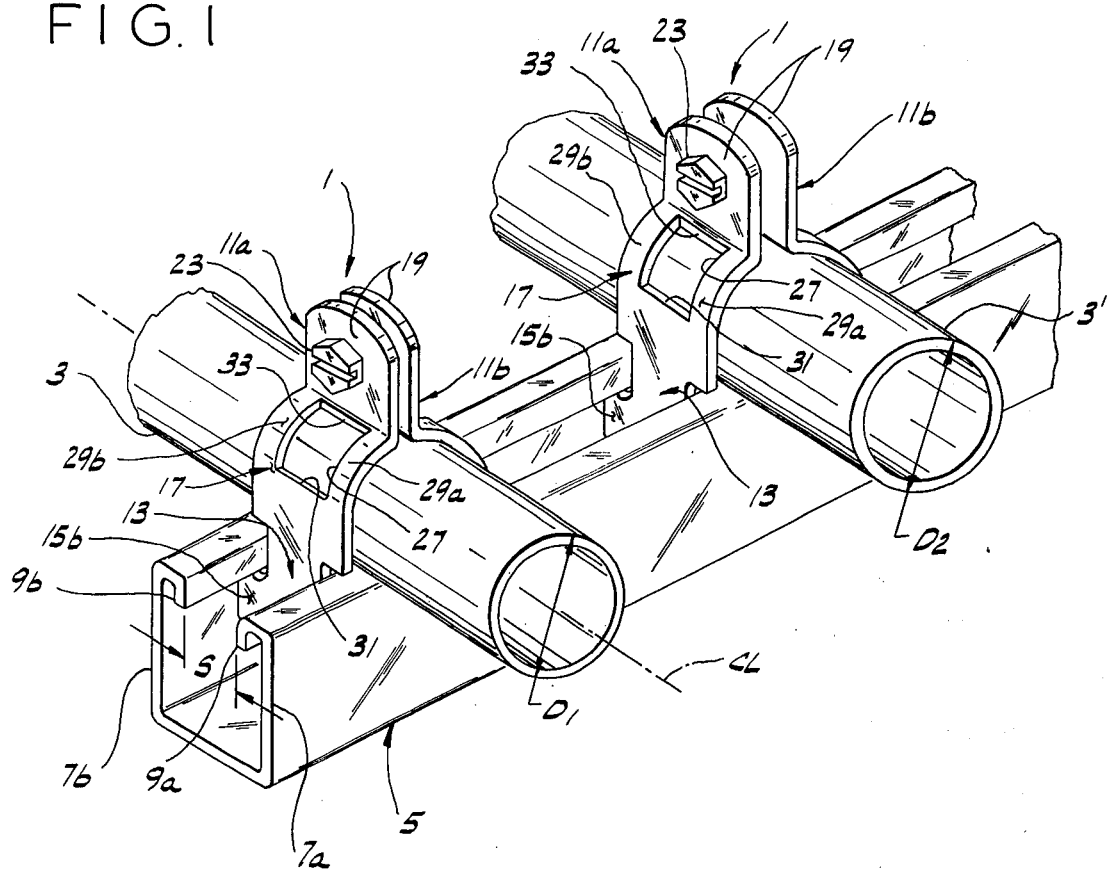
FIG. 1 is a perspective view of two identical clamps of this invention clamping two conduits of different outer diameters to a channel-shaped support.

Referring now to the drawings, a clamp of this invention, indicated in its entirety at 1, is shown clamping a conduit of circular cross-section to a channel-shaped support. In accordance with this invention, clamp 1 is adapted to clamp any of a plurality of conduits or pipes having outer diameters ranging from a specified minimum outer diameter (D1, as indicated on a conduit 3 in FIG. 1) to a specified maximum outer diameter (D2, as indicated on conduit 4). For example, one size of clamp 1 will clamp all conduits having outer diameters ranging from 1.16 inches (29.5 mm.) to 1.32 inches (33.5 mm.) thereby to enable the clamp of this invention to clamp thin wall conduit, intermediate wall conduit and standard piping all having a nominal inside diameter of 1 inch (25.4 mm.). Heretofore, three different clamps were required to clamp the same three conduits. More particularly, the clamp of this invention is adapted to clamp a conduit to a channel-shaped support 5. This support or channel has a pair of side flanges 7a, 7b, the outer ends of which each have a respective inwardly directed, hook-shaped lip 9a, 9b formed thereon. These lips are spaced from one another and define a slot S therebetween which extends the length of the channel. As is best shown in FIG. 1, the conduits bear against the outer edges of flanges 7a, 7b and extend generally perpendicularly to the channel.

Clamp 1 has a pair of identical clamp straps 11a, 11b, one for each side of conduit 3. Each strap has a generally flat stem portion 13 of a width less than the width of slot S. The stem has an ear 15a, 15b at each side thereof extending out beyond the side edge of the stem portion for engagement with a corresponding lip 9a, 9b of channel 5. As shown in FIG. 2, ears 15a, 15b are hook-shaped and are adapted to positively engage lips 9a, 9b. The strap further has an intermediate portion, as generally indicated at 17, extending from the stem portion. This intermediate portion is bent out of the plane of the stem portion (see FIG. 3) and it extends around and grips a portion of the outer surface of conduit 3 to be clamped. Specifically, this intermediate portion is formed to have a radius of curvature which corresponds to a conduit having an outer diameter equal to the above-specified minimum outer diameter D1 of the range of conduit diameters that one size clamp of this invention may accommodate. Upon the clamp being applied to a conduit having a diameter ranging between the specified diameters D1 and D2 for that clamp, and upon being drawn together in a manner as will be hereinafter specified, the intermediate portions of the straps will conform to the radius of curvature of the conduit being clamped.

Each strap 11a or 11b is shown to have a flat outer end portion 19 generally parallel to its stem portion 13 and a bend line 20 constituting a transition between its intermediate and outer end portions. As shown in FIG. 3, stem portions 13 of straps 11a, 11b are spaced apart by the outer diameter of the conduit to be clamped and the outer end portions 19 of the straps are spaced closely relative to one another. Each outer end portion has an aperture 21 therethrough for reception of a clamping bolt 23, the latter threadably receiving a nut 25 which when tightened draws the outer end portions of the straps together. Apertures 21 are spaced from bend line 20 a sufficient distance to enable bolt 23 to be inserted therethrough and to permit the bolt to be threaded into the nut, with the nut being held against turning by the bend line.

As indicated at 27, each clamp strap 11a, 11b has a cutout or window through its intermediate portion 17 thus defining bridge portions 29a, 29b on opposite sides of the cutout. Cutout 27 weakens the intermediate portion and thus enables the bridge portions to bend so as to conform to the outer surface of the conduit being clamped as straps 11a, 11b are forcibly drawn together by bolt 23. Preferably, the clamp straps are made of relatively stiff, sheet metal or the like having a uniform thickness. For example, the straps may be made of mild commercial steel, stainless steel or aluminum. It is desirable upon application of a force to the strap or conduit which tends to pull the conduit away from channel 5 that ears 15a, 15b fail prior to the failure of any portion of the strap, and more particularly fail prior to the failure of bridge portions 29a, 29b. In order to insure that intermediate portion 17 of each strap is as flexible as possible so as to enable the strap to readily conform to the outer surface of a conduit 3 to be clamped, and in order to insure that ears 15a, 15b fail prior to any other portion of the strap, bridge portions 29a, 29b, cutout 27 and the ears of a clamp of this invention are so structured relative to one another that the strength of the bridge portions only slightly exceeds the strength of the ears so as to insure that the ears will fail prior to the bridge portions, and yet that the bridge portions will be as bendable as possible so that they may readily be bent around the outer surface of the conduit.

As shown in FIG. 2, conduit 3 is supported on the outer edges of flanges 7a, 7b of channel 5. Cutout 27 of each strap has a first or bottom edge 31 extending between bridge portions 29a, 29b adjacent stem portion 13 and a second or upper edge 33 extending between the bridge portions adjacent bend line 20. With straps 11a, 11b on opposite sides of conduit 3, the bottom edges 31 of cutout 27 are shown to be substantially aligned with one another and with the centerline CL of conduit 3 when the conduit being clamped has an outer diameter equal to the minimum specified diameter D1 of the range of diameters which the clamp may accommodate. By positioning the lower edge 31 of the cutout adjacent the centerline of the smaller size conduit to be clamped, the entire length of intermediate portion 17 is constituted by the relatively flexible bridge portions 29a, 29b so that it may readily conform (i.e., bend) to the shape of the conduit.

To install a clamp 1 of this invention, a conduit 3 to be clamped is brought into engagement with the outer edges of channel flanges 7a, 7b and a clamp strap 11a, 11b of the proper size for the nominal size of the conduit to be clamped is inserted in slot S on opposite sides of the conduit. Ears 15a, 15b of the straps are hooked on channel lips 9a, 9b and intermediate portions 17 of the straps are brought into engagement with a portion of the outer surface of the conduit. Bolt 23 is inserted through apertures 21 and is threaded into nut 25 which is held against turning by bend line 20. Upon tightening bolt 23, straps 11a, 11b are drawn together causing their intermediate portions to conform to the curvature of the conduit. As the bolt is tightened the straps slide on the outer surface of the conduit as the outer end portions 19 and bend lines are drawn together. This places the straps under tension and forcibly pulls the conduit into engagement with the support channel thereby frictionally locking the conduit on the support channel.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A clamp for clamping a member of generally circular cross-section, such as a conduit or the like, to a channel having side flanges each having an inwardly directed, hook-shaped lip defining a slot therebetween with said member extending generally perpendicularly to said channel and engaging the outer edges of said lips, said clamp being adapted to clamp any of a plurality of said members having outer diameters ranging from a specified minimum diameter to a specified maximum diameter, said clamp comprising a pair of clamp straps, one for each side of the member, each of which comprises a generally flat stem portion of a width less than the width of said slot, and an ear at each lateral side of said stem extending out beyond a respective side of the stem for engagement with one of said lips, an intermediate portion bent out of the plane of said stem to extend around and grip a portion of the surface of said member to be clamped, an outer end portion, a transition between said intermediate and outer end portions, and means engageable with said outer end portions for drawing together said straps on opposite sides of said member, said intermediate portion of each strap being formed to be selectively weakened along a part thereof so as to enable said part of said intermediate portion to conform to the curvature of the outer surface of the conduit member being clamped, said intermediate portion including a pair of spaced bridge portions defining a cutout therebetween, said cutout having a first or lower edge and a second or upper edge extending between said bridge portions, said lower edge being positioned at substantially the same level as the longitudinal centerline of the conduit member being clamped when the latter has said specified minimum diameter and said upper edge being positioned adjacent said transition so that said bridge portions extend along said weakened part of said intermediate portion and so that said bridge portions are bendable so as to conform to the curvature of the outer surface of said conduit member upon said straps being drawn together, and said bridge portions having a width such that they have a tensile strength which only slightly exceeds the tensile strength of said ears so that upon application of a force to pull said conduit member away from said channel said ears will fail prior to failure of said bridge portions.

2. A clamp as set forth in claim 1 wherein each of said straps is a one-piece unit made of relatively stiff, but bendable, sheet metal having a uniform thickness, and wherein said means for drawing said straps together comprises a threaded fastener interconnecting said outer end portions of the straps whereby upon tightening said fastener said straps are drawn together causing said bridge portions to bend so as to conform to the curvature of said member.

* * * * *